United States Patent
Denk et al.

(10) Patent No.: US 7,909,071 B2
(45) Date of Patent: Mar. 22, 2011

(54) METHOD FOR THE CONTAMINATION-PREVENTING EMPTYING AND FILLING OF BULK CONTAINERS

(75) Inventors: Richard Denk, Scheyern (DE); Manfred Helmer, Rohrbach (DE); Timothey Rocholl, Hamm (DE)

(73) Assignee: Hecht Anlagenbau GmbH, Pfaffenhofen (DE)

( * ) Notice: Subject to any disclaimer, the term of this patent is extended or adjusted under 35 U.S.C. 154(b) by 898 days.

(21) Appl. No.: 10/596,394

(22) PCT Filed: Dec. 10, 2004

(86) PCT No.: PCT/EP2004/014109
§ 371 (c)(1),
(2), (4) Date: Jun. 8, 2007

(87) PCT Pub. No.: WO2005/056443
PCT Pub. Date: Jun. 23, 2005

(65) Prior Publication Data
US 2007/0251599 A1    Nov. 1, 2007

(30) Foreign Application Priority Data

Dec. 11, 2003 (DE) .................................. 103 58 037
Feb. 6, 2004 (DE) .......................... 10 2004 005 961

(51) Int. Cl.
*B65B 1/28* (2006.01)
*B65B 69/00* (2006.01)
(52) U.S. Cl. ............. 141/114; 141/10; 141/11; 141/314
(58) Field of Classification Search .................... 141/10, 141/11, 114, 313, 314
See application file for complete search history.

(56) References Cited

U.S. PATENT DOCUMENTS

| 4,991,633 | A | * | 2/1991 | Wong ............................ 141/114 |
| 5,944,070 | A |  | 8/1999 | Schmidt et al. |
| 6,653,377 | B1 |  | 11/2003 | Lloyd et al. |
| RE40,840 | E | * | 7/2009 | Lloyd et al. ................... 524/221 |
| 2001/0027822 | A1 |  | 10/2001 | Bertolo |

FOREIGN PATENT DOCUMENTS

DE   198 06 932 A1   9/1999
DE   200 01 005 U1   6/2001

OTHER PUBLICATIONS

International Search Report for International Application No. PCT/EP2004/014109.

* cited by examiner

*Primary Examiner* — Timothy L Maust
*Assistant Examiner* — Nicolas A Arnett
(74) *Attorney, Agent, or Firm* — Roberts Mlotkowski Safran & Cole, P.C.; David S. Safran (57) ABSTRACT

A method for the contamination-preventing transferring bulk material between a container having a flexible opening and a connecting tube using a tubular film is placed around the connecting tube; the tubular film is tied beyond the connecting tube leaving a free end of the tubular film beyond the tying point; the flexible opening and the tubular film are connected; the tying points of the outlet and the tubular film are untied, and the bulk material transferred; the free end of the tubular film, is constricted and additional tubular film is pulled from a tubular film supply until clean tubular film is available beyond the connecting tube; the tubular film is closed at two points in the clean section and cut in two between them; additional tubular film is pulled from the tubular film supply, and tied at a tying point located at a distance from the cutting point.

21 Claims, 12 Drawing Sheets

METHOD FOR THE CONTAMINATION-PREVENTING EMPTYING AND FILLING OF BULK CONTAINERS

BACKGROUND OF THE INVENTION

1. Field of the Invention

The present invention relates to methods for emptying/filling of bulk goods from/into a container without contamination.

2. Description of Related Art

The steadily growing demand for industrially manufactured products is also imposing increasing demands in terms of raw materials and components that are used. The products involving an increasing degree of specialization, which means: increasingly higher degrees of purity, increasingly more effective substances, and unfortunately, also increasingly more dangerous substances, toxicity, the triggering of allergies and the effects of contamination and pollution are also on the increase. The problems are going in two directions. First, in the area of operator protection—the operator must not be exposed to any danger—and secondly, in the area of product protection—the product must not be contaminated with foreign substances. These are general requirements which are imposed mainly in bio- and food technology, chemical and pharmaceutical sectors of industry.

To meet these requirements the products to be processed are not handled openly, but in closed transport containers, e.g., fixed transport containers, flexible transport containers (also called big-bags) or barrels. All transport containers may additionally be equipped with an inner film bag.

This raises the question as to how these transport containers can be emptied and filled while avoiding contamination.

While expensive docking systems are already available for fixed transport containers, e.g., split valves, cone systems or the like, there is absolutely no satisfactory solution for transport containers with a flexible outlet and inlet.

The problem lies in the fact that, up till now, it has not been possible to connect transport containers with a flexible outlet in a form that is sealed from the surrounding area to a product inlet or product outlet of an installation or system, and to remove the emptied or filled container after emptying and filling again without contamination.

Conventional systems use mechanical clamping devices for connecting the containers, where the outlet on the connection system is clamped and sealed. However, when the container is changed, both the connection system and the container are open. Contamination at the connection point and contamination of the operator and the surrounding area may result from dust-laden air and dripping residual product.

SUMMARY OF THE INVENTION

The object of the invention is to provide a method for emptying and filling bulk goods containers with little contamination using protective films.

This object is achieved according to the invention with a method according to the invention as described below.

Preferred embodiments of the method according to the invention are described in the following with reference to the accompanying drawings.

DETAILED DESCRIPTION OF THE INVENTION

Emptying Process

As shown in FIGS. 1 to 9, a connection tube 1 with the outlet at the bottom, through which the contents of a flexible transport container disposed over connection tube 1 are discharged, is enclosed by a hose film 3 and is sealed by tying the hose film at 3.1, at the beginning of the emptying process. The hose film extends from a film carrier 2 surrounding the connection tube 1, in which carrier the film is present in a length sufficient for several emptying processes ("endless film"). The film is guided between an axial sealing ring 5, located in a sealing ring recess 6 on the upper edge of the connection tube, and the upper edge of connection tube 1 against which it acts, and can be removed from the film carrier 2 in the required length. Hose film 3 is first tied at 3.1 above filling tube 1. Here, the hose film is pulled out of the film carrier to the extent that an end piece that can be widened into a funnel shape is produced above the tying point. This end piece is inserted in a radial expanding ring 9, which rests in a expanding ring recess 8, and is therefore clamped to the outlet edge of a flexible container (a so-called big bag, for example) arranged above filling tube 1, by means of a counter ring 10 designed as a disposable part, whose outside diameter is roughly equal to the inside diameter of radial expanding ring 9, at which time the container to be emptied, as shown at 11.1, is still tied up (See FIGS. 1 to 3).

Figure 1:
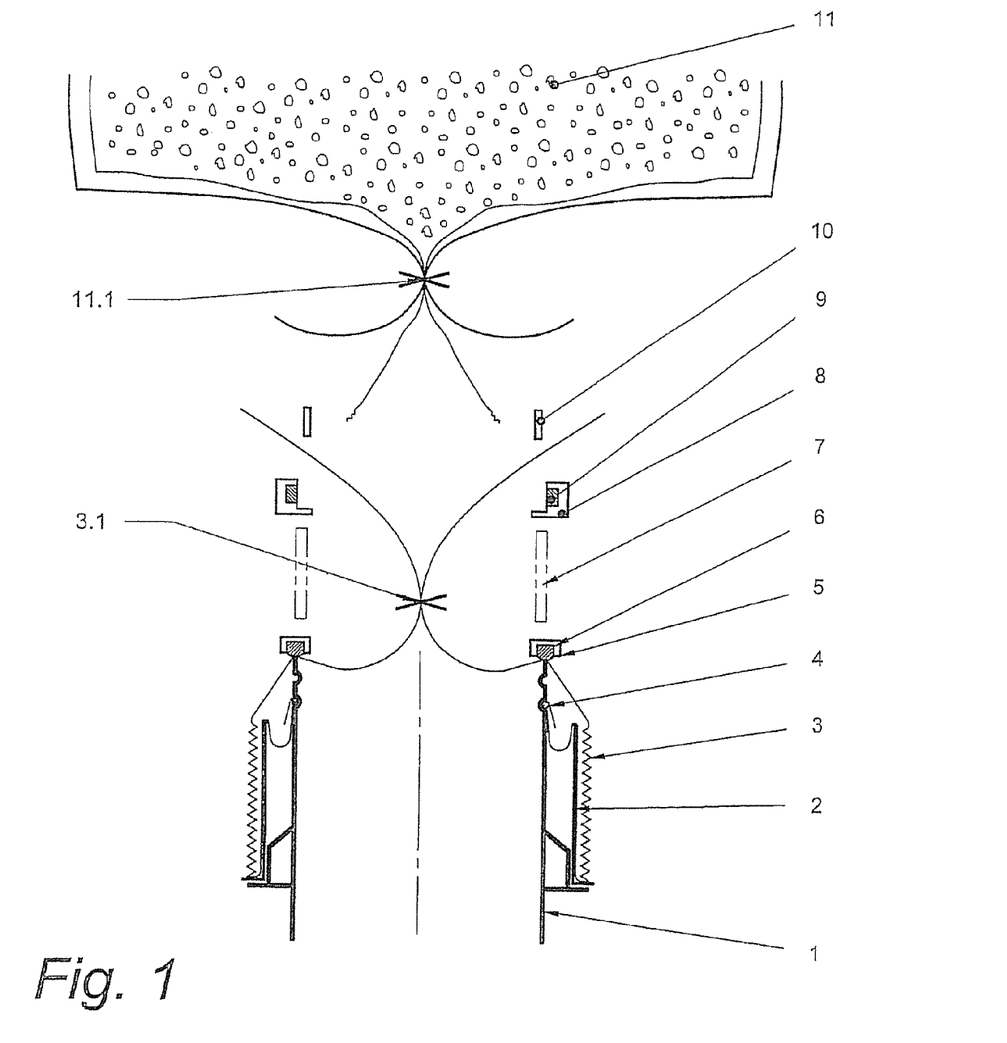
FIGS. 1 to 9 show method steps between an initial position and the next time this initial position is reached using a film carrier which is able to receive a film supply for several container changes, when a container with a flexible outlet is emptied.
Figure 2:
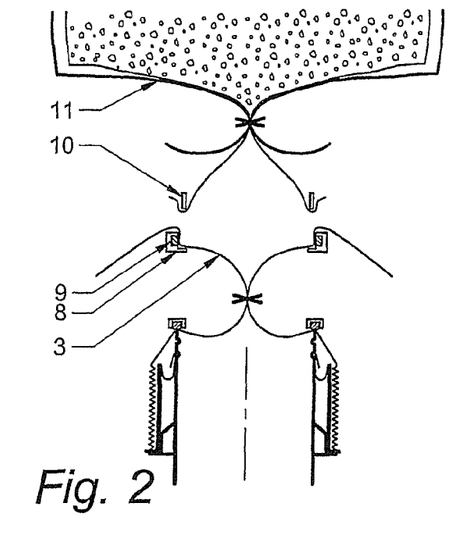
Figure 3:
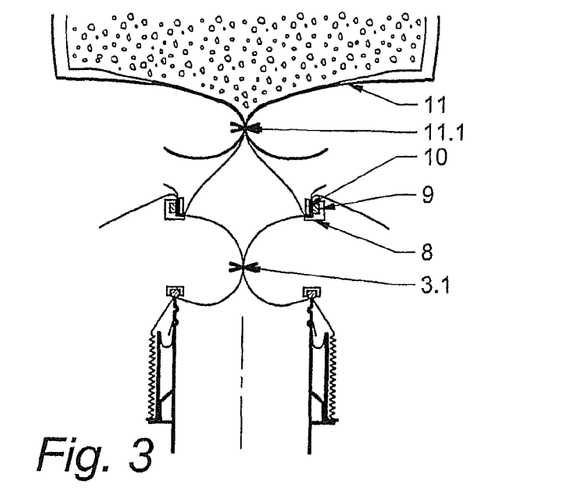
Figure 4:
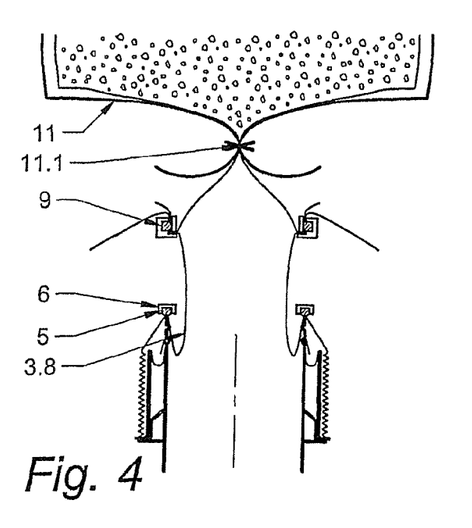
Figure 5:
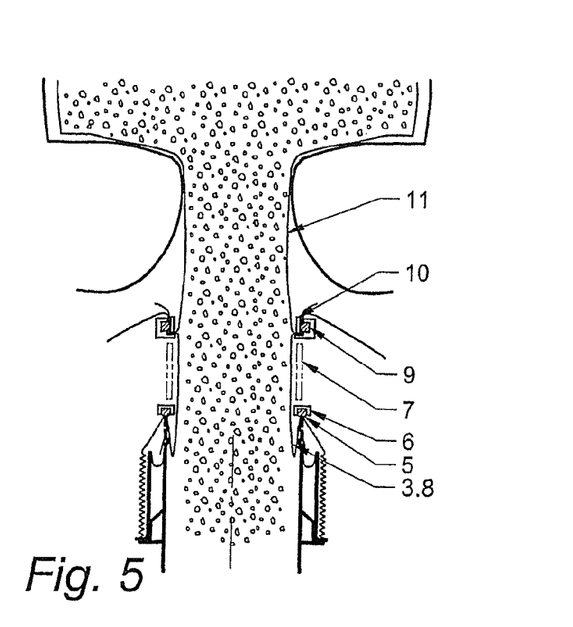

The hose film is then untied at 3.1, which gives rise to the condition shown in FIG. 4. The container to be emptied is then opened at 11.1 and the bulk goods contained in the container drop from the container through connection tube 1 (FIG. 5).

A pocket 3.8 of the hose film is placed inside connection tube 1 and protects the upper region of connection tube 1 from the adhesion of product. If the product pressure is high, protective film 3 can be retained by a support tube 7 (shown in FIG. 5 as a dotted line). As soon as the flexible container (big bag) is emptied, and evacuated if necessary, the free end of hose film 3 is pulled together over expanding ring recess 8 and connected to the outlet of the container 11 at 3.2. In particular, it is tied to it as shown (FIG. 6).

Figure 6:
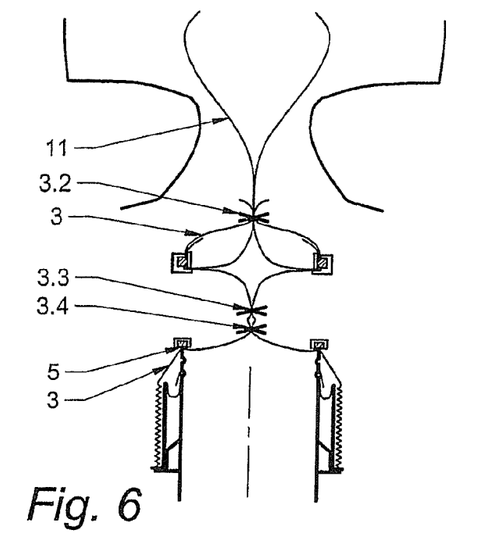

Axial sealing ring 5 is then relieved of load and hose film 3 is pulled out until sufficient clean hose film is obtained that it can be sealed in the clean region at 3.4, and immediately above it in region 3.3 (see, FIG. 6). In particular it is tied, as shown.

Figure 7:
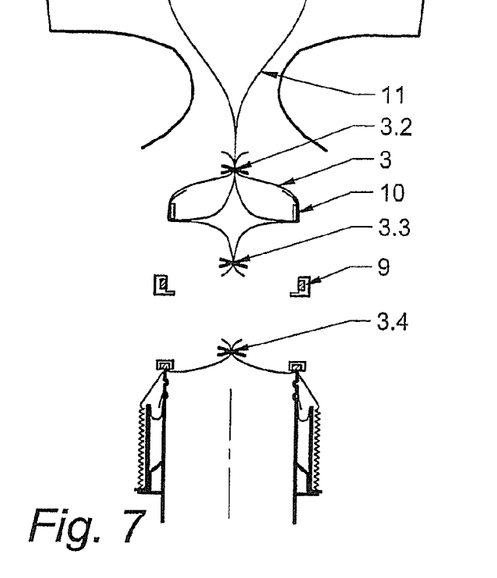

Radial expansion ring 9 is then relieved of load and the hose film separated between the tying points 3.3 and 3.4 (see, FIG. 7). Flexible container 11 can now be disposed of free of contamination. Counter ring 10 is a disposable part which is also disposed of.

Figure 8:
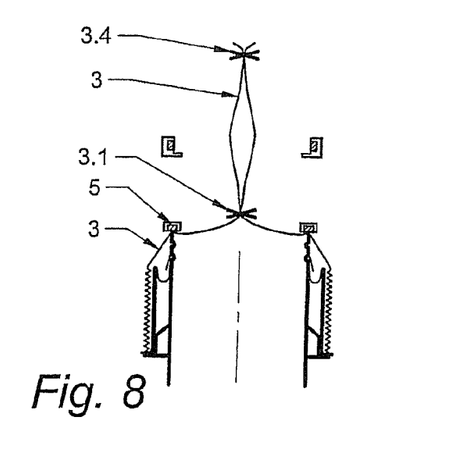

Hose film 3 is then pulled out of film carrier 2 again, until sufficient film is present below tying point 3.4 for a new connection funnel and it can be tied again immediately above the filling tube at 3.1 (FIG. 8). With the removal of the upper tying at 3.4, the hose film can be expanded to form a funnel with which the condition shown in FIG. 1 is again reached and the device is ready for a new filling process.

This means that after the emptied container is detached from connection tube 4, both the contaminated outlet of the container and the contaminated connection tube are never open but are always sealed by surrounding protective film.

FIGS. 10 to 17 show method steps from a time when the remaining film contained in film carrier 2 is no longer sufficient for a further emptying process. The remaining film must be removed and at the same time it must be ensured that neither the remaining film can fall into connection tube 1 nor the connection tube, possibly contaminated, is unsealed at the top.

Figure 10:
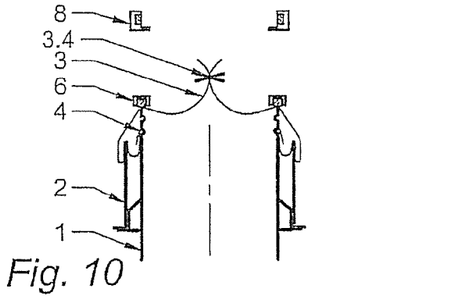
FIGS. 10 to 17 show method steps for disposal of the end of a protective film that can no longer be used and the fitting of a new one when emptying a container.

FIG. 10 shows the condition according to FIG. 7, except that the hose film supply is at the end.

Figure 11:
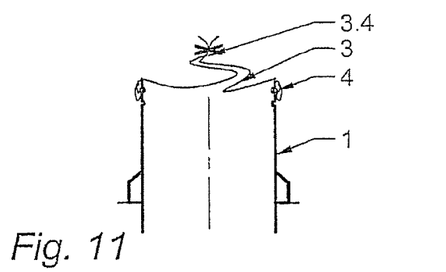
Figure 12:
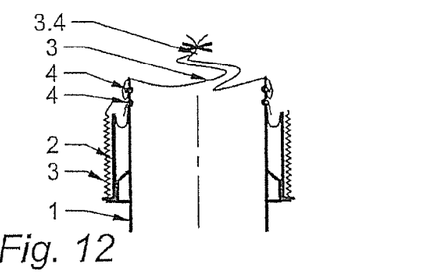
Figure 13:
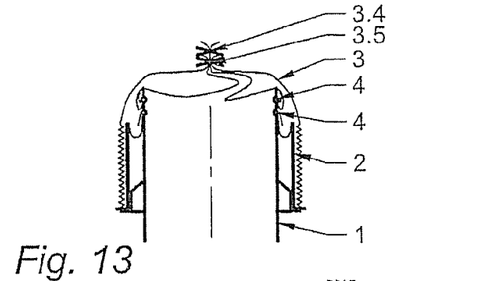
Figure 14:
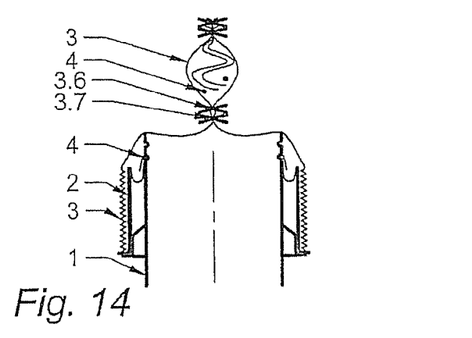
Figure 15:
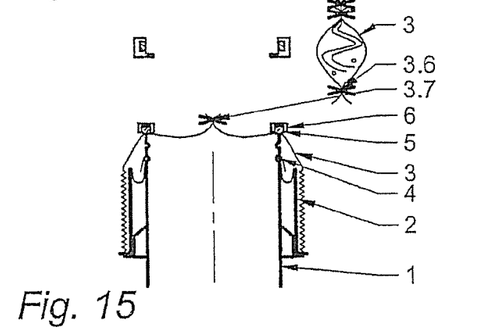

As shown in FIG. 11, axial sealing ring 5, which clamps the hose film against the filling tube edge, is relieved of load and both recess 6 for axial sealing ring 5 and recess 8 for the expansion ring are removed so that film carrier 2 is accessible and can be removed (FIG. 11), a new film carrier 2, with a new film, is fitted (FIG. 12) and the end of the hose film of the new film carrier 2 is secured to a suitable elastic fixing ring 4 on connection tube 1. The beginning of the new hose film is then pulled over the old remaining film and both films are tied at 3.5 underneath tying point 3.4 (FIG. 13). Both films are then pulled up with the old film inside the new film together with the elastic fixing ring of the old film, and the new hose film tied twice at 3.6 and 3.7 underneath the old hose film lying in it (FIG. 14). The new hose film is then cut between the two tying points 3.6 and 3.7 so that the remaining old hose film, packed in a piece of new hose film, can be disposed of (FIG. 15). The tying point at 3.7 prevents the packet cut off with the old hose film from falling into connection tube 1, and at the same time ensures that the connection tube is sealed.

Figure 9:
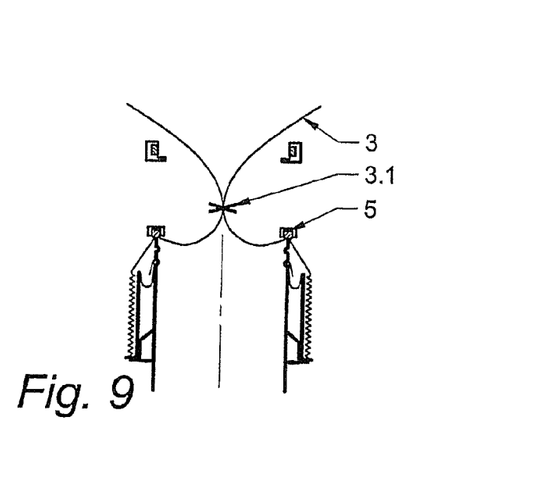
Figure 16:
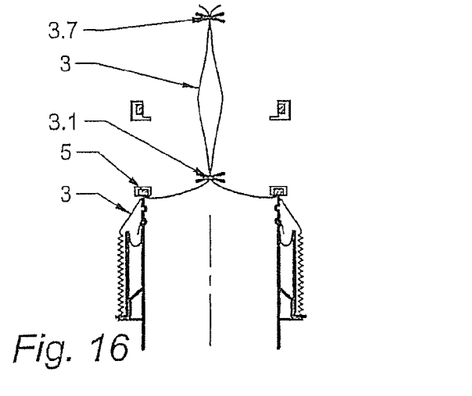
Figure 17:
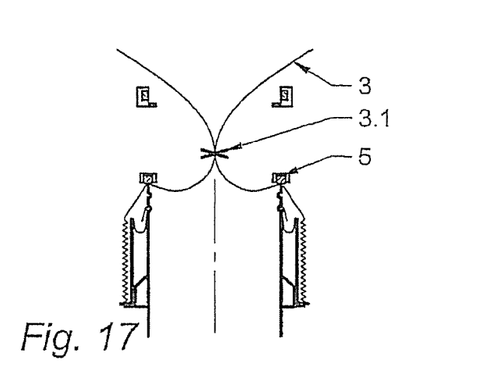
Figure 18:
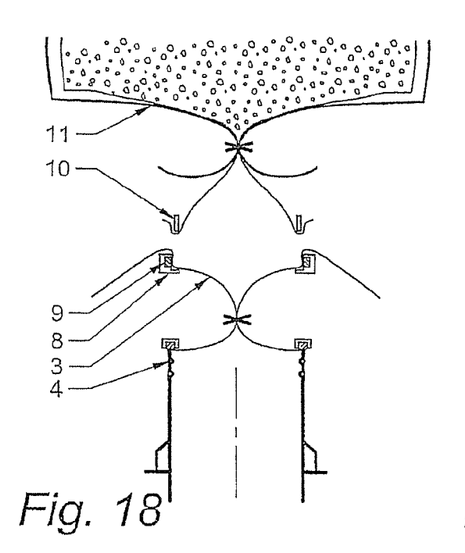
FIGS. 18 to 27 show steps for individual bag emptying with a protective film for only one emptying process.
Figure 19:
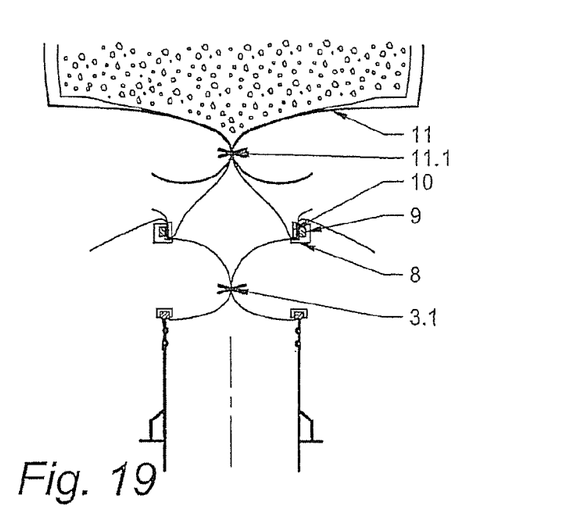
Figure 20:
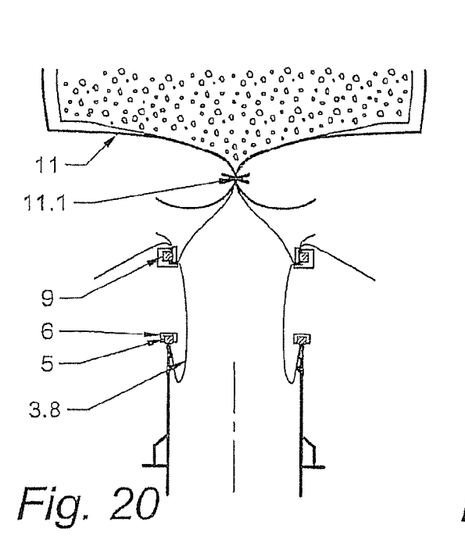
Figure 21:
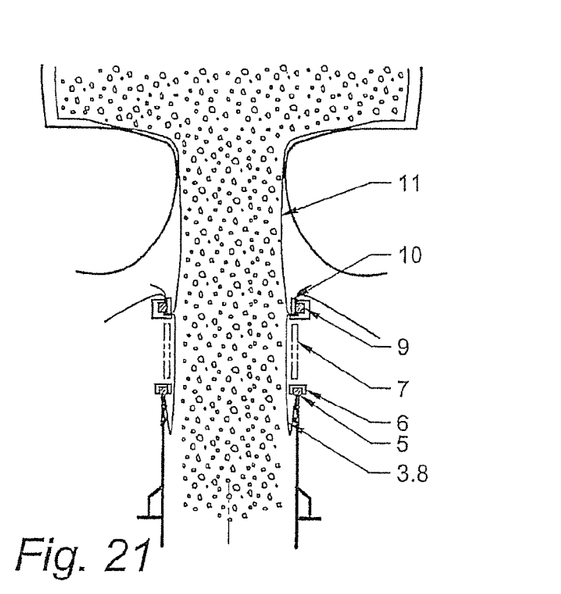
Figure 22:
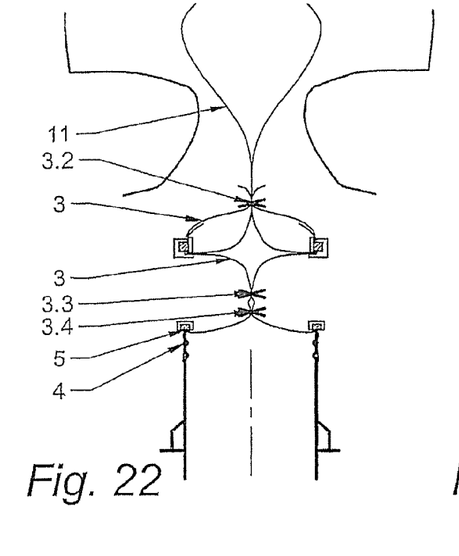
Figure 23:
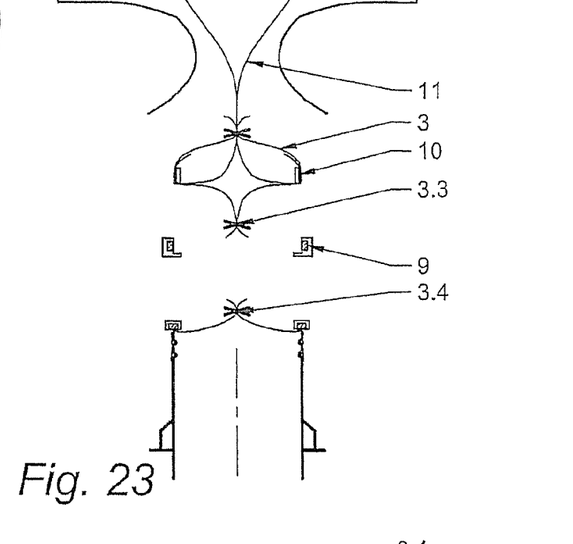
Figures 24, 25:
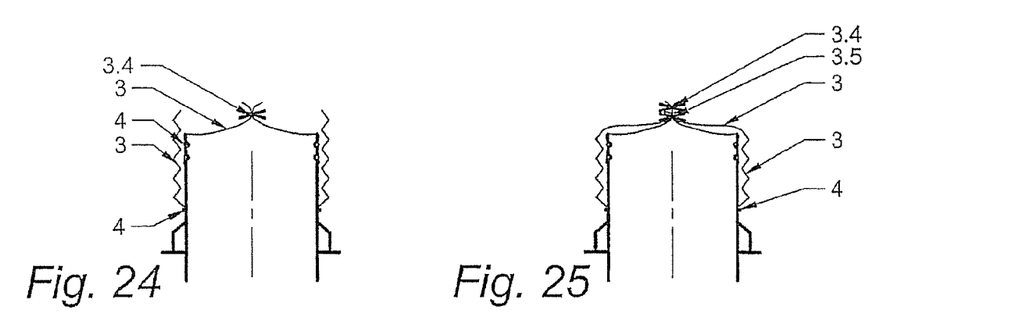
Figures 26, 27:
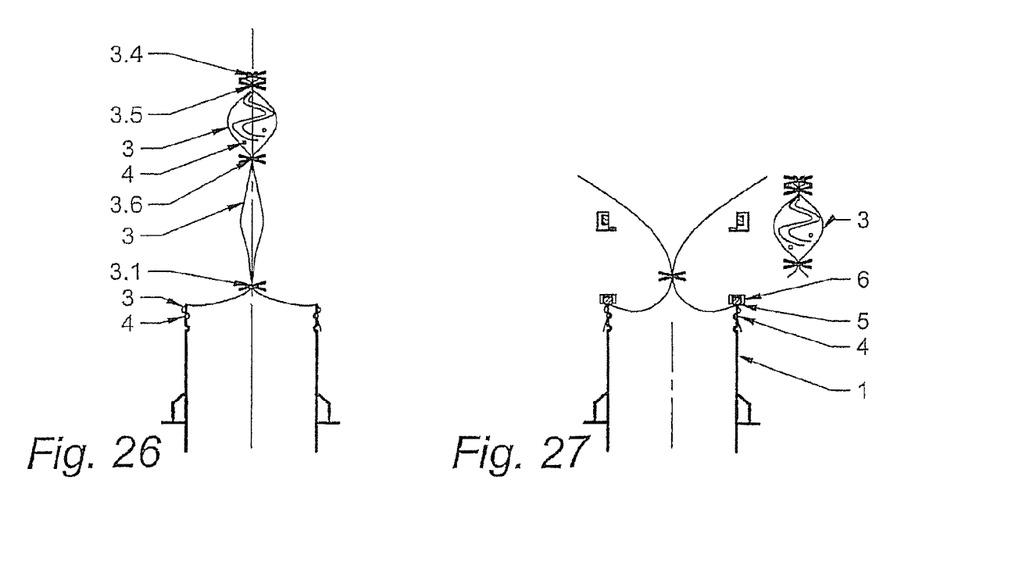

FIGS. 16 & 17 correspond to FIGS. 8 & 9 and the associated method steps correspond to those described with reference to FIGS. 8 & 9.

During the emptying of an individual bag, it is not necessary to provide hose film for several emptying processes. Connection tube 1 is then surrounded with hose film for a single emptying process, the design of the parts being otherwise the same.

The method steps for this case, including disposal of the used hose film by means of a new hose film, are shown in FIGS. 18 to 27. In this case FIGS. 18 to 21 correspond to FIGS. 2 to 5, FIGS. 22 and 23 correspond to FIGS. 6 and 7, FIGS. 24 and 25 correspond to FIGS. 12 and 13, and FIGS. 26 and 27 correspond to FIGS. 14 to 17, the only difference being that the packet containing the old film is not cut off until the end of the process.

The advantage of this embodiment is that the connection funnel is not contacted by product and is therefore completely free of contamination, thus the connection to the outlet of the container to be emptied takes place without contamination. This is because a new single film, screened by the old hose film, does not come into contact with the edge of the connection tube, which can be contaminated under certain circumstances. The new hose film is protected in the same way as the beginning of an endless film, which replaces a used endless film.

Figure 28:
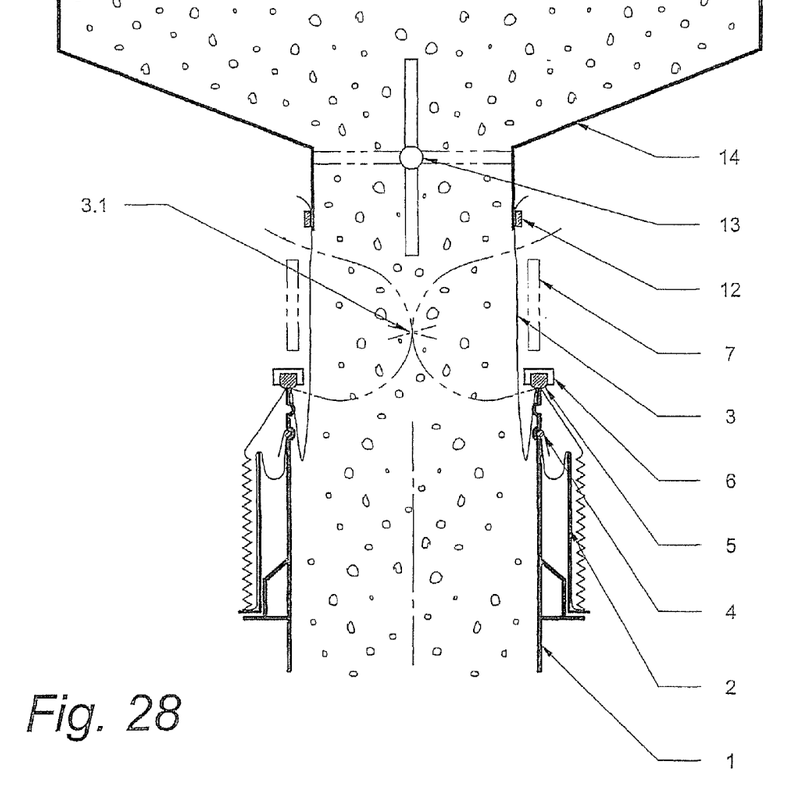
FIG. 28 shows the method during emptying a container with rigid outlet.

FIG. 28 shows the method when applied to a container with a rigid outlet, the container being designed as a fixed transport container 14 with a sealing cap 13 in the container.

Radial expansion ring 9, with expanding ring recess 8 and counter ring 10, are dispensed with. The connection funnel of hose film 3, described above, is secured directly to the container outlet by means of a clamp band 12. After the tie is loosened at tying point 3.1, the container can be emptied.

After emptying, hose film is tied twice in the clean region, after being pulled out, as described with reference to FIG. 6, and cut in between as in FIG. 7. This ensures that the container can be cut off without contamination.

As far as the replacement of film carrier 2 is concerned, this is carried out exactly as described above for containers with a flexible outlet.

Apart from sealing point 3.1, the other sealing points 3.2-3.7 can also be advantageously formed, for example, by welding or another permanent type of sealing.

Filling Process

Figure 29:
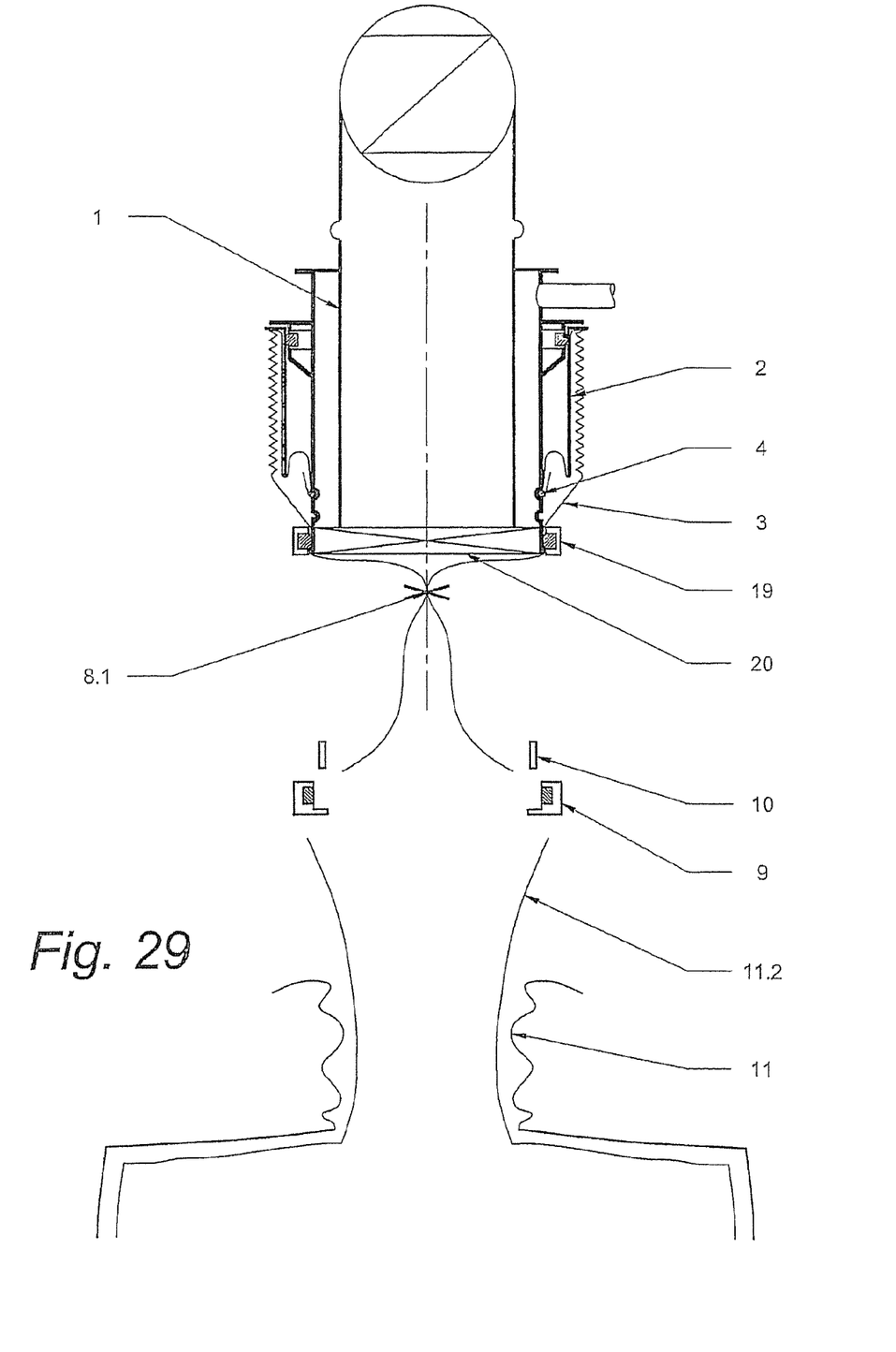
FIGS. 29 to 39 show method steps of a filling process between an initial position and the next time this initial position is reached, using a foil carrier which is able to receive a film supply for several container changes.
Figure 30:
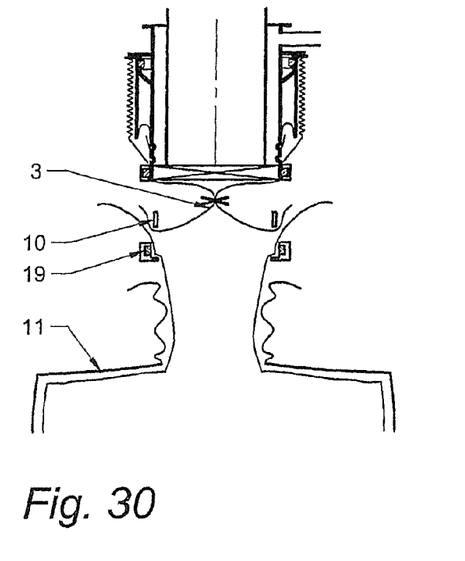
Figure 31:
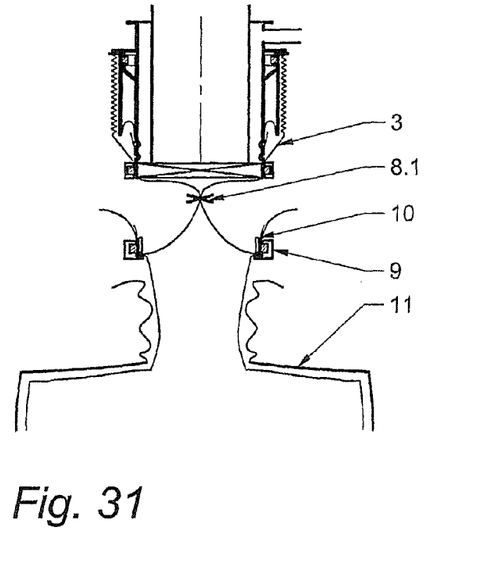
Figure 32:
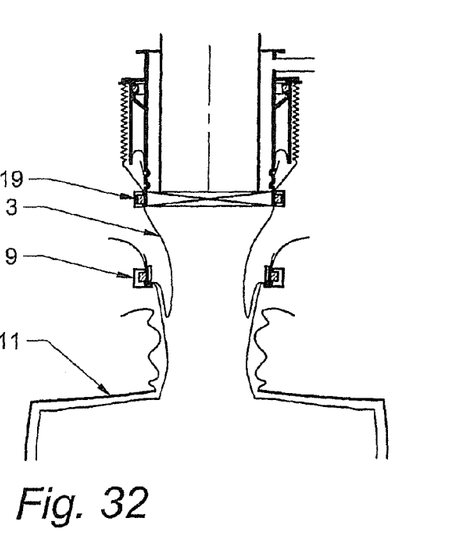
Figure 39:
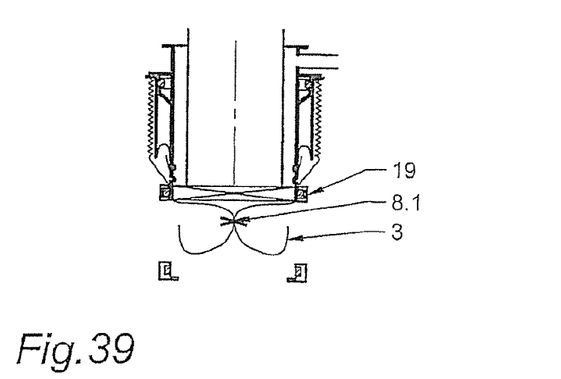

As shown in FIGS. 29 and 39, at the beginning of the filling process, a connection tube 1, through which a flexible transport container placed underneath it is to be filled, is wrapped in a hose film 3 and sealed by tying of the hose film at 8.1. To protect from falling product and to minimize product loss, a further sealing mechanism 20 can be integrated in connection tube 1. Hose film 3 extends from a film carrier 2 surrounding the connection tube, in which carrier it is present in a length sufficient for several filling processes ("endless film"). Film 3 is guided between a radial sealing ring 19 located at the lower edge of the connection tube and connection tube 1, and can be taken from film carrier 2 in the required length by pulling. The hose film 3 is first tied at 8.1 underneath connection tube 1. Here, the hose film is pulled out of the film carrier until a piece of hose that can be widened is produced underneath the tie. Counter ring 10 is inserted in this end piece. Inlet 11.2 of the flexible transport container 11 can then be clamped and sealed with protective film 3 and counter ring 10 in the container inlet radial sealing ring 9 (see, FIGS. 29 to 31).

Figure 33:
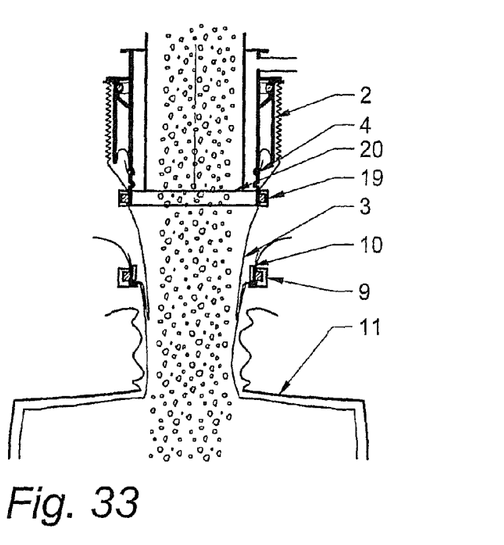

The connection between connection tube 1 and transport container inlet 11.2 is opened by opening the tie of the hose film at 8.1. The transport container can be filled after sealing mechanism 20 is opened (FIG. 33). Here, a pocket of the hose film 3 is placed on the edge of the container inlet 11.2 and protects it from coarse product adhesion.

Figure 34:
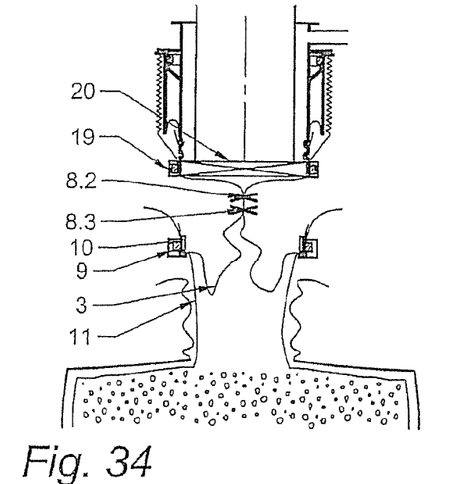
Figure 35:
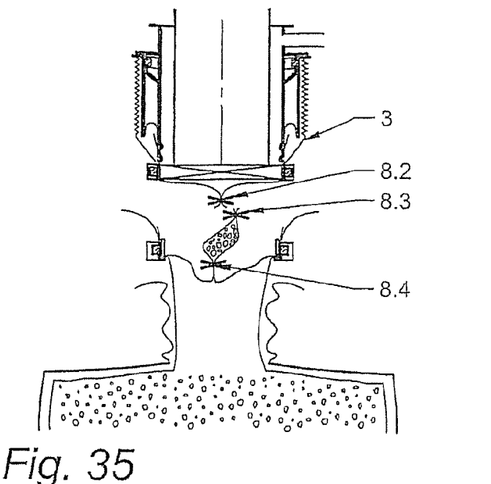
Figure 36:
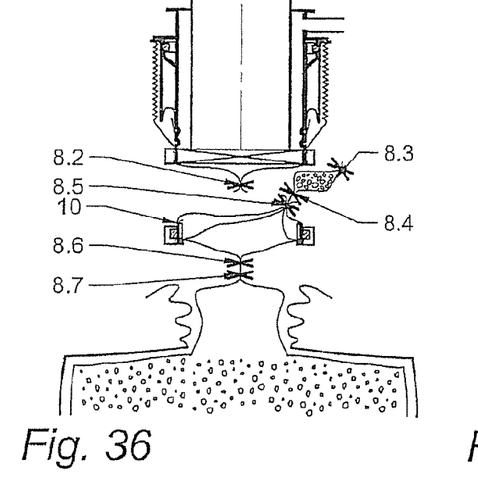

As soon as the flexible container (big bag) 11 is completely filled and sealing mechanism 20 is closed, radial sealing ring 9 on connection tube 1 is relieved of load and fresh hose film 3 is pulled out until sufficient clean hose film is obtained for it to be sealed in the clean region at 8.2 and immediately underneath at 8.3 (see FIG. 34). In particular, it can be tied at those points, as shown.

After hose film 3 is cut off between seals 8.2 and 8.3, a product sample can be removed by hand, if necessary, from transport container 11 and enclosed in the hose film by ting at 8.4. Inlet 11.2 of transport container 11 must then be tied initially above radial sealing ring 9 with tie 8.5, then below radial sealing ring 8.6, and once again, immediately below this, at 8.7. Radial sealing ring 9 is then relieved of load and the hose film is cut off between tying points 8.4 and 8.5 (cutting off the sample bag) and between 8.6 and 8.7 (see, FIG. 37). The film pocket, with counter ring 10 enclosed, can now be disposed off without contamination.

Figure 38:
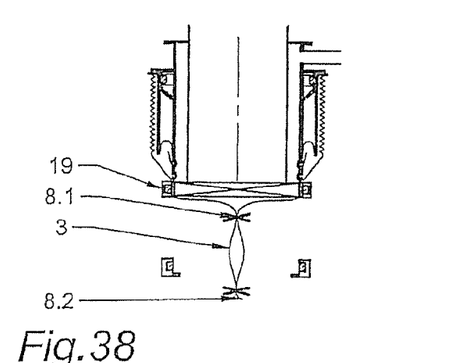

Hose film is then pulled out of film carrier 2 once again until sufficient film is present above tying point 8.2 for a new connection funnel, and this can be tied once again immediately underneath connection tube 1 at 8.1 (FIG. 38). When the lower tie at 8.2 is removed, hose film 3 can again be widened to form a funnel, with which the condition shown in FIG. 29 is again reached and the device is ready for a new filling process.

This means that after the filed container 11 is detached from connection tube 1 both the contaminated inlet of the container and the contaminated connection tube are never open but are always sealed by surrounding protective film.

FIGS. 40 to 47 show method steps from a time when the remaining film contained in film carrier 1 is no longer sufficient for a further filling process. The remaining film must be disposed of and at the same time it must be ensured that the filling tube is at no time unsealed.

Figure 37:
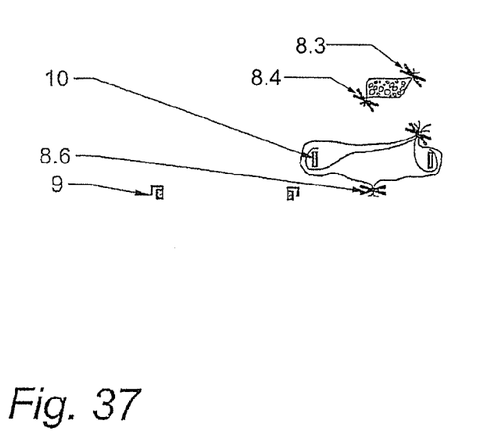
Figure 40:
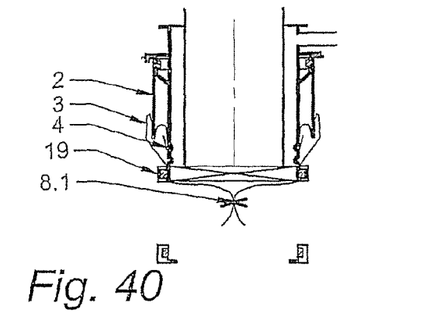
FIGS. 40 to 47 show method steps for disposing of the end of a protective film that can no longer be used, and the fitting of a new one.

FIG. 40 shows the condition shown in FIG. 37, except that the hose film supply is used up.

Figure 41:
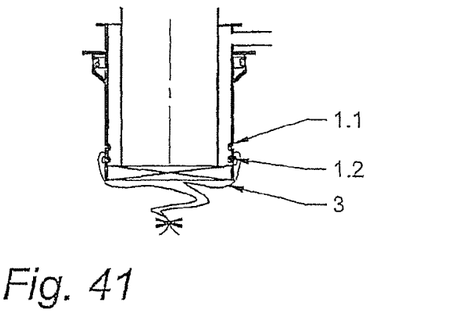
Figure 42:
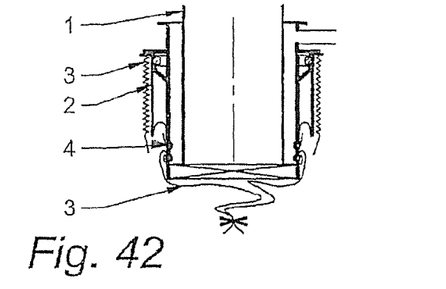
Figure 43:
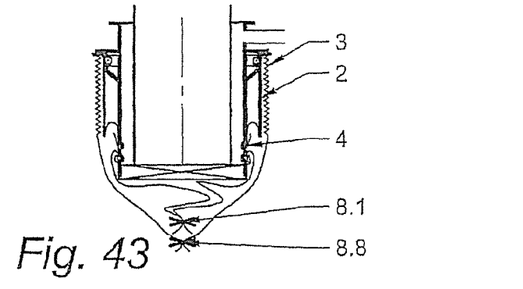
Figure 44:
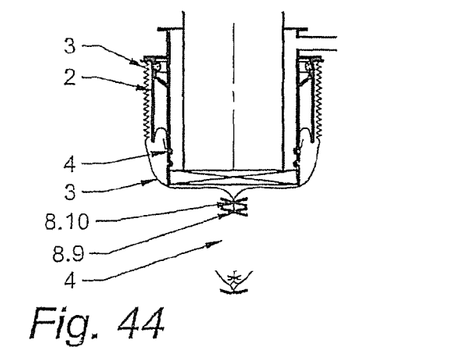
Figure 45:
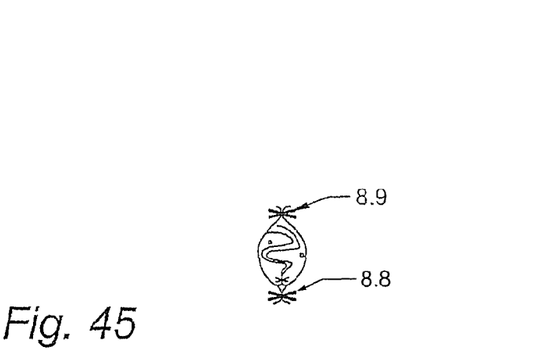

As shown in FIG. 41, radial sealing ring 19 and container inlet radial sealing ring 9 are removed so that film carrier 2 is accessible and can be removed. A new film carrier 2 with new film 3 is fitted (FIG. 42) and the end of the hose film is secured with a suitable elastic fixing ring 4 to connection tube 1. The beginning of the new hose film is then pulled over the old remaining film and sealed at 8.8 (FIG. 43). The old film with its fixing ring is then pulled off and enclosed in a film pocket by tying the new film 8.9 and the hose film is tied once again at a short distance above 8.9 at 8.10 (FIG. 44). After hose film 3 is cut between tying points 8.9 and 8.10, the remaining old film can be disposed of with the new protective film surrounding it. Radial sealing 19 and container inlet radial sealing ring 9 can now be returned to the working position.

Figure 46:
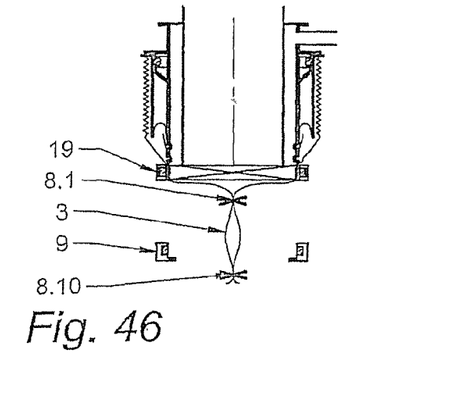
Figure 47:
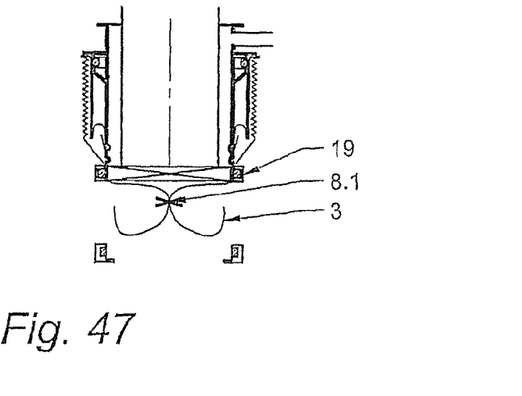

FIGS. 46 & 47 correspond to FIGS. 38 & 39 and the associated method steps for forming a new connection funnel correspond to those described with reference to FIGS. 38 & 39.

FIGS. 48 to 51 show method steps that are required if it is necessary to clean the bottom of sealing mechanism 20 due to product adhesions.

Figure 48:
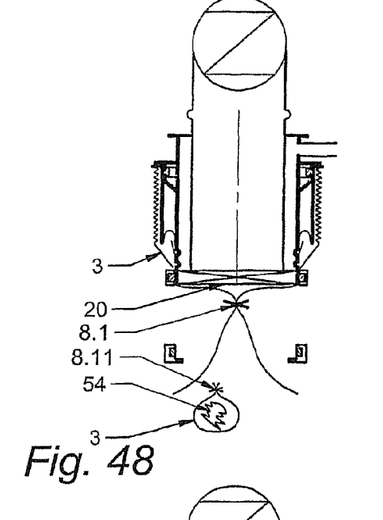
FIGS. 48 to 53 show method steps for cleaning the bottom of the filling/sealing mechanism.
Figure 49:
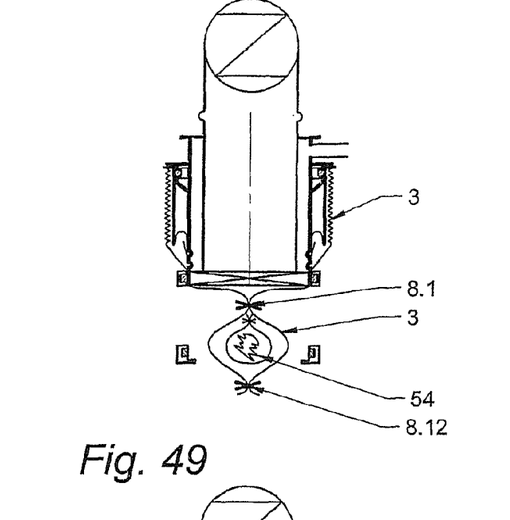
Figure 50:
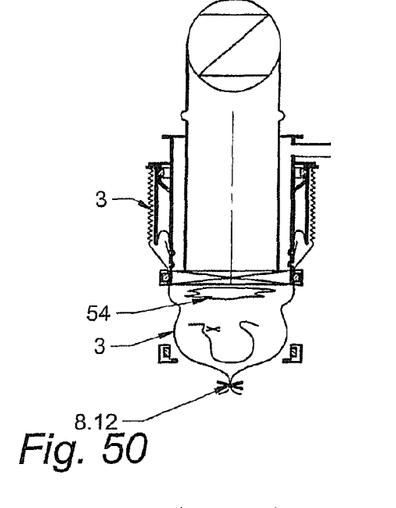
Figure 51:
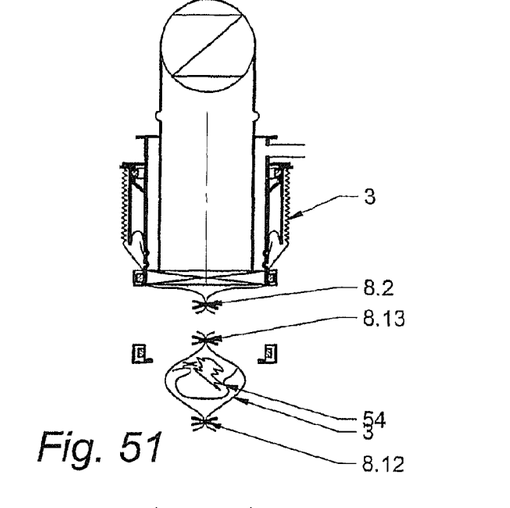

FIG. 48 shows the condition shown in FIG. 39 after completion of a filling process. A cleaning cloth is packed in a film bag in a suitable clean surrounding area, with or without cleaning agent. This bag can now be enclosed in the connection funnel of hose film 3, with tie 8.12. After tie 8.1 is loosened and the cleaning bag is opened, the surface of sealing mechanism 20 can be wiped. Protective film 3 is then tied again at 8.2 and 8.13 underneath connection tube. The hose film is cut off between the tying points and the film pocket is disposed off with the cleaning utensils (FIGS. 50 & 51).

Figure 52:
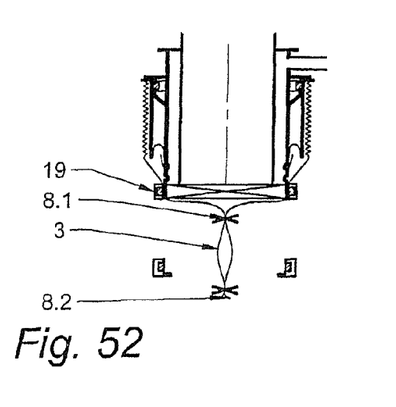
Figure 53:
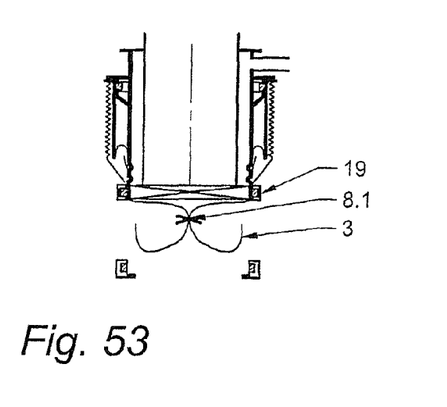

FIGS. 52 & 53 correspond to FIGS. 38 & 39, and the associated method steps for forming a new connection funnel correspond to those described with reference to FIGS. 38 & 39.

Apart from sealing point 8.1, the other sealing points 8.2-8.13 can advantageously also be formed by welding, for example, or another permanent method of sealing.

What is claimed is:

1. A method for transferring bulk goods, without contamination, into or out of a container via a connection tube, comprising the steps of:
    positioning the container and the connection tube one above the other,
    arranging a hose film around the connection tube, so that it rests against an edge of the connection tube at an open end thereof so that it seals,
    tying the hose film at a tying point beyond the connection tube so that a free end of the hose film, which can be widened in the shape of a funnel, remains beyond the tying point,
    forming a clamping connection of opening of the container to the hose film so that a portion of the free end of the hose film remains beyond the clamping connection,
    untying the tying point,
    transferring the bulk goods,
    tying of the free end of the hose film remaining beyond the clamping point,
    pulling hose film out of a hose film supply until a region of clean hose film is available beyond the connection tube,
    sealing of the hose film at two adjacent sealing points in the region of clean hose film,
    cutting the hose film at a point between the two adjacent sealing points, one of the two sealing points remaining attached to hose film after said cutting,
    pulling of hose film out of the hose film supply and tying the same again at a new tying point that is at a distance from the sealing point remaining in the region of the cutting point,
    removing the sealing point remaining in the region of the cutting point and widening of the hose film between the cutting point and the new tying point to form a funnel shape.

2. A method for transferring bulk goods according to claim 1,
    wherein the container has a flexible outlet
    wherein the container, with an outlet thereof tied at a tying point, is positioned above the connection tube during said positioning step,
    wherein a clamping connection is formed between the flexible outlet of the container and the hose film so that free hose film remains over the clamp connection,
    wherein the tying points the outlet and hose film are untied during said untying step and
    wherein the bulk goods are emptied from the container to the connection tube during said transferring step.

3. The method according to claim 2, wherein an axial sealing ring acts against an edge of the connection tube on an inlet side above the hose film, and makes sealing contact of the hose film against the edge of the connection tube on the inlet side.

4. The method according to claim 3, wherein the hose film is supplied by a film carrier surrounding the connection tube.

5. The method according to claim 4, wherein the hose film is held against a first bead running around the periphery of the connection tube by an elastic fixing ring.

6. The method according to claim 5, wherein, when the hose film supply is used up, the hose film is no longer pulled out of the hose film supply and the following method steps are carried out after said cutting step:
    removing the axial sealing ring,
    pulling the elastic fixing ring, with the hose film, out of the first bead into a second bead located above the first bead,
    fitting a new film carrier with new hose film, and clamping the end of the new hose film with a new elastic fixing ring in the first bead against the connection tube,
    pulling the beginning of the new hose film out of the new film carrier,
    sealing the new hose film against the old hose film at a sealing point located underneath the remaining sealing point of the old hose film,
    pulling up the new hose film with the old hose film connected to it until the end of the old hose film is released from the second bead, sealing the new hose film below the end of the old hose film at two adjacent sealing points, cutting the new hose film between the two adjacent points leaving one of the sealing points remaining at cut end the end new hose film, disposing of the old hose film enclosed in the cut-off portion of the new hose film, further pulling up of the new hose film and tying the new hose film at a tying point located at a distance from the sealing point remaining at the end thereof, and removing the end sealing point and widening the new hose film to form a funnel shape.

7. The method according to claim 2, wherein said clamping connection is produced by a radial expansion ring surrounding a connection point on the outside and a counter ring supporting the connection point on the inside.

8. The method according to claim 2, wherein the sealing points are tying points.

9. The method according to any claims 2, wherein the sealing points are welds.

10. The method according to claim 2, wherein the container has a flexible outlet, wherein the container, with an inlet thereof tied at a tying point, is positioned below the connection tube during said positioning step, wherein a clamping connection is formed between the flexible inlet of the container and the hose film so that free hose film remains over the clamp connection, wherein the tying points of the outlet and hose film are untied during said untying step and wherein the bulk goods are delivered via the connection tube to the container during said transferring step, pulling hose film out of a hose film supply until a clean region of hose film is available underneath the connection tube, sealing the hose film at two adjacent sealing points in the clean region, cutting the hose film between the two adjacent sealing points in the clean region, tying the free end of the inlet remaining above the clamping point against the hose film and securing it to it, sealing of the inlet underneath the clamped connection at two adjacent points and cutting the inlet between them, pulling hose film out of the hose film supply and retying it at a tying point at a distance from the cutting point of the hose film, removing the sealing point in the region of the cutting point of the hose film, and widening the hose film between the cutting point and the tying point located at a distance from the cutting pint to form a funnel shape.

11. The method according to claim 10, wherein a radial sealing ring holds the hose film against the end of the connection tube on the outlet side to make the sealing contact of the hose film against the end of the connection tube on the outlet side.

12. The method according to claim 11, wherein a film carrier surrounding the connection tube is used to receive the hose film supply.

13. The method according to claim 12, wherein the end of the hose film is clamped with an elastic fixing ring against a first bead running around the periphery of the connection tube.

14. The method according to claim 13, wherein a radial expanding ring surrounding the connecting point on the outside and a counter ring supporting the connecting point on the inside are used to form the clamping connection of the inlet of the flexible container and the hose film.

15. The method according to claim 1, wherein the container has a flexible outlet wherein the container, with an outlet thereof tied at a tying point, is positioned above the connection tube during said positioning step, wherein the hose film arranged around the connection tube during said arranging step is of a length sufficient for only a single filling process, wherein the container, with an outlet thereof tied at a tying point, is positioned above the connection tube during said positioning step, wherein a clamping connection is formed between the flexible outlet of the container and the hose film so that free hose film remains over the clamp connection, wherein the tying points the outlet and hose film are untied during said untying step and wherein the bulk goods are emptied from the container to the connection tube during said transferring step, tying of the free end of the hose film remaining above the clamping point to the container outlet, pulling the hose film until a region of clean hose film is available above the connection tube, sealing of the hose film at two adjacent sealing points in the clean region, cutting the hose film between the two sealing point in the clean region, fitting a new hose film on the connection tube and clamping the end of the new hose film against the connection tube underneath the old hose film, pulling out the beginning of the new hose film, sealing the new hose film against the old hose film at a sealing point located underneath the sealing point of the old hose film, pulling up the new hose film with the old hose film connected to it until the end of the old hose film is released, sealing the new hose film below the end of the old hose film at a sealing point, cutting the new hose film below the sealing point that is below the end of the old hose film, disposing of the old hose film packed in the new hose film, pulling the new hose film up further and tying the new hose film at a tying point located at a distance from the sealing point remaining at the end, widening the new hose film to form a funnel.

16. The method according to claim 1, wherein the container is a transport container with a rigid outlet and is arranged sealed condition above the connection tube.

17. The method according to claim 16, wherein an axial sealing ring holds the hose film against an edge of the connection tube on the inlet side for making the sealing contact of the hose film against the edge of the connection tube on the inlet side.

18. The method according to claim 17, wherein the hose film is supplied from a film carrier surrounding the connection tube.

19. The method according to claim 18, wherein the end of the hose film is clamped with an elastic fixing ring against a first bead running round the periphery of the connection tube.

20. The method according to claim 19, wherein, when the hose film supply is used up, the hose film is no longer pulled out of the hose film supply and the following steps are performed after the cutting step:

removing the axial sealing ring, pulling the elastic fixing ring, with the hose film, out of the first bead into a second bead located above the first bead, fitting a new film carrier with new hose film, and clamping the end of the new hose film with a new elastic fixing ring in the first bead against the connection tube, pulling the beginning of the new hose film out of the new film carrier, sealing the new hose film against the old hose film at a sealing point located underneath the remaining sealing point of the old hose film, pulling up the new hose film with the old hose film connected to it until the end of the old hose film is released from the second bead, sealing the new hose film below the end of the old hose film at two adjacent sealing points, cutting the new hose film between the two adjacent points leaving one of the sealing points remaining at cut end the end new hose film, disposing of the old hose film enclosed in the cut-off portion of the new hose film, further pulling up of the new hose film and tying the new hose film at a tying point located at a distance from the sealing point remaining at the end thereof, and removing the end sealing point and widening the new hose film to form a funnel shape.

21. The method according to claim 16, wherein, when the hose film supply is used up, the hose film is no longer pulled out of the hose film supply and the following steps are performed after the cutting step:

removing the axial sealing ring, pulling the elastic fixing ring, with the hose film, out of the first bead into a second bead located above the first bead, fitting a new film carrier with new hose film, and clamping the end of the new hose film with a new elastic fixing ring in the first bead against the connection tube, pulling the beginning of the new hose film out of the new film carrier, sealing the new hose film against the old hose film at a sealing point located underneath the remaining sealing point of the old hose film, pulling up the new hose film with the old hose film connected to it until the end of the old hose film is released from the second bead, sealing the new hose film below the end of the old hose film at two adjacent sealing points, cutting the new hose film between the two adjacent points leaving one of the sealing points remaining at cut end the end new hose film, disposing of the old hose film enclosed in the cut-off portion of the new hose film, further pulling up of the new hose film and tying the new hose film at a tying point located at a distance from the sealing point remaining at the end thereof, and removing the end sealing point and widening the new hose film to form a funnel shape.

* * * * *